United States Patent
Haley et al.

(10) Patent No.: US 6,532,754 B2
(45) Date of Patent: Mar. 18, 2003

(54) METHOD OF OPTIMIZING AND RATING A VARIABLE SPEED CHILLER FOR OPERATION AT PART LOAD

(75) Inventors: Paul F. Haley, La Crosse, WI (US); Dennis R. Dorman, La Crosse, WI (US)

(73) Assignee: American Standard International Inc., New York, NY (US)

( * ) Notice: Subject to any disclaimer, the term of this patent is extended or adjusted under 35 U.S.C. 154(b) by 92 days.

(21) Appl. No.: 09/843,256

(22) Filed: Apr. 25, 2001

(65) Prior Publication Data

US 2002/0157405 A1 Oct. 31, 2002

(51) Int. Cl.⁷ ................................................ F25B 49/02
(52) U.S. Cl. .......................................... 62/129; 702/182
(58) Field of Search ........................... 62/125, 126, 127, 62/129, 130; 236/94; 165/11.1; 702/182; 700/28, 32, 33, 34, 36, 108

(56) References Cited

U.S. PATENT DOCUMENTS

| 4,483,152 A | * | 11/1984 | Bitondo ................. 702/182 X |
| 4,507,930 A | * | 4/1985 | Kaya et al. .................... 62/129 |
| 4,510,576 A | * | 4/1985 | MacArthur et al. ........ 62/125 X |
| 4,611,470 A | * | 9/1986 | Enström ...................... 62/127 |
| 4,768,346 A | * | 9/1988 | Mathur ........................ 62/127 |
| 4,885,914 A | * | 12/1989 | Pearman ................. 702/182 X |
| 5,083,438 A | * | 1/1992 | McMullin .................... 62/129 |

* cited by examiner

*Primary Examiner*—Harry B. Tanner
(74) *Attorney, Agent, or Firm*—William J. Beres; William O'Driscoll

(57) ABSTRACT

A method of optimizing the design of a chiller involves placing more emphasis on the chiller's performance at part load than at full load and rating the chiller accordingly. In some embodiments, compressor speed and impeller diameter are chosen to optimize the chiller's performance at part load. With the chosen impeller diameter, operation at full load is then achieved by increasing compressor speed, opening inlet guide vanes, and perhaps sacrificing some efficiency. If necessary, an inverter over speeds the compressor by driving it at a speed beyond that which the compressor would normally run if it were driven at the nominal line frequency of the electrical power feeding the inverter.

16 Claims, 1 Drawing Sheet

METHOD OF OPTIMIZING AND RATING A VARIABLE SPEED CHILLER FOR OPERATION AT PART LOAD

BACKGROUND OF THE INVENTION

1. Technical Field

This invention generally pertains to a method of optimizing the performance of a variable speed chiller operating at a part load condition, and more specifically pertains to a method of rating the overall performance of such a chiller.

2. Description of Related Art

A typical chiller system includes a closed loop refrigerant circuit comprising a compressor, a condenser, a flow restriction, and an evaporator. Hot, compressed refrigerant discharged from the compressor enters the condenser where the refrigerant is cooled by another fluid, such as ambient air or water from a cooling tower. From the condenser, the compressed refrigerant expands upon passing through the flow restriction, which lowers the refrigerant's pressure and temperature significantly before the refrigerant enters the evaporator. While inside the evaporator, the refrigerant cools another fluid that is distributed to and circulated through various smaller heat exchangers. The smaller heat exchangers cool various comfort zones, such as rooms or other areas within a building. After passing through the evaporator, the refrigerant returns to the suction side of the compressor to complete the cycle.

The load on a chiller will vary with a change in the cooling demand of the building being cooled and can vary with a change in the temperature of the fluid that cools the condenser. Thus, chillers usually have a way of adjusting its cooling effectiveness to meet the load. To adjust the cooling effectiveness, the refrigerant's flow rate can be adjusted by varying the compressor's speed and/or by adjusting the position of the chiller's inlet guide vanes. Typical inlet guide vanes comprise a set of variable pitch blades that throttle the flow of refrigerant drawn through a suction throat of the compressor. The angular pitch of the blades determines the extent to which the guide vanes restrict the flow.

Examples of a chiller whose cooling effectiveness is adjusted by varying compressor speed and/or the opening of inlet guide vanes are disclosed in U.S. Pat. Nos. 5,355,691 and 4,151,725. The '725 patent is further representative of U.S. Pat. Nos. 4,282,718; 4,282,719; 4,275,987; 4,355,948; 4,351,160; 4,546,618 and 4,608,833.

Although a chiller can adjust its output to meet various loads, a chiller's performance rating often only reflects a chiller's efficiency when operated at full load. For example, a chiller's efficiency rating may be based solely on its efficiency when operated at full speed and with the guide vanes wide open. Chiller efficiency, as used herein and below, refers to a comparison of a chiller's power consumption to its cooling effect, and is often expressed in terms of kilowatts per ton.

However, in some cases, a chiller is given a rating that factors in a chiller's efficiency performance at various loads. Such a rating is known as an IPLV or an integrated part load value whose derivation is explained in ARI Standard 550/590-1998. Even with such a rating, chillers today are still designed for operating at full capacity. In other words, a compressor's impeller size, motor speed, and other features are chosen to provide maximum efficiency for a given full load condition. Such a design approach places less importance on the chiller's efficiency at part load. However, in many applications, a chiller may need to run partially loaded more often than fully loaded.

Consequently, there is a need for a chiller optimized for part load conditions while maintaining an ability to function at full load, albeit at reduced efficiency.

SUMMARY OF THE INVENTION

An object of the present invention to apply a selection code that optimizes the performance of a variable speed chiller at a part load condition, and rate the chiller's overall performance based on the chiller's performance at both full load and part load conditions.

Another object is to have an inverter or variable frequency drive reduce a compressor's speed at a part load condition, and raise the speed of the compressor at full load, such that the compressor's full load speed is other than the speed at which it would run if the compressor's motor were driven at a nominal line frequency of fifty or sixty hertz.

A further object is to produce a chiller that operates more efficiently at part load than at full load.

A still further object is to produce a chiller that operates more efficiently (i.e., lower kw/ton) at part load than at full load by reducing the speed of the compressor and, if necessary, partially closing the inlet guide vanes at the part load condition.

Another object of the invention is provide a chiller with a performance rating that emphasizes a chiller's higher efficiency (i.e., lower kw/ton) at part load.

Yet, another object is to subject a chiller to a part load condition by reducing the temperature of the fluids that exchange heat with the refrigerant in the chiller's evaporator or condenser, and then rating the chiller's performance when operating under such conditions.

These and other objects of the invention are provided by producing a chiller for optimum performance at a part load condition where the chiller's speed is reduced and the chiller's inlet guide vanes are partially closed, and providing the chiller with a composite efficiency rating that reflects the chiller's efficiency (i.e., kw/ton) at full load and part load.

The present invention provides a method of rating a chiller's performance. The chiller includes a compressor driven by a motor, which in turn is driven by an inverter that creates an electrical output having a variable frequency from an electrical input of a nominal frequency. The method comprises determining a part load value that reflects the chiller's performance at a part load condition, wherein the variable frequency of the electrical output at the part load condition is at a reduced frequency that is less than the nominal frequency of the electrical input; determining a full load value that reflects the chiller's performance at a full load condition, wherein the variable frequency of the electrical output at the full load condition deviates from the nominal frequency of the electrical input and is greater than the reduced frequency; and providing a composite rating based on the part load value and the full load value, whereby the composite rating indicates the chiller's performance overall.

The present invention also provides a method of rating a chiller's performance, wherein the chiller's performance is that of a chiller including a compressor adapted to compress a refrigerant whose flow is throttled by an inlet guide vane that can move between a more-open position and a less-open position. The compressor is driven by a motor, which in turn is driven at various speeds by an inverter that creates an electrical output from an electrical input. The electrical output has a variable frequency and the electrical input is at a substantially constant nominal frequency. The method comprises determining a part load value that reflects the chiller's performance at a part load condition, wherein the variable frequency of the electrical output is at a reduced frequency that is less than the substantially constant nominal frequency of the electrical input and the inlet guide vane is at its less-open position; determining a full load value that reflects the chiller's performance at a full load condition, wherein the variable frequency of the electrical output is greater than the reduced frequency and the inlet guide vane is at its more-open position; and providing a composite rating based on the part load value and the full load value, whereby the composite rating indicates the chiller's performance overall.

The present invention further provides a method of rating a chiller's performance, wherein the chiller's performance is that of a chiller including a compressor adapted to compress a refrigerant whose flow between an evaporator and a condenser is throttled by an inlet guide vane that can move between a more-open position and a less-open position. The compressor is driven by a motor, which in turn is driven at various speeds by an inverter that creates an electrical output from an electrical input. The electrical output has a variable frequency and the electrical input is at a substantially constant nominal frequency. The method comprises at a full load condition, conveying into the condenser a heat absorbing fluid at a full load condenser temperature, wherein the heat absorbing fluid once inside the condenser absorbs heat from the refrigerant; at the full load condition, conveying into the evaporator a heat emitting fluid at a full load evaporator temperature, wherein the heat emitting fluid once inside the evaporator rejects heat to the refrigerant; at a reduced load condition, conveying into the condenser the heat absorbing fluid at a reduced load condenser temperature that is lower than the full load condenser temperature; at the reduced load condition, conveying into the evaporator the heat emitting fluid at a reduced load evaporator temperature that is lower than the full load evaporator temperature; operating the chiller at the full load condition and at a full load efficiency, wherein the guide vane is at the more-open position, and the variable frequency is at least as great as the substantially constant nominal frequency; operating the chiller at the reduced load condition and at a reduced load efficiency that is better than the full load efficiency, wherein the guide vane is at the less-open position, and the variable frequency is less than the substantially constant nominal frequency; and providing a composite rating based on the full load efficiency and the reduced load efficiency, whereby the composite rating provides an indication of the chiller's performance overall.

The present invention additionally provides a method of optimizing a variable frequency drive controller controlling the motor of a compressor under a variety of conditions. The method comprises the steps of: determining part load and full load conditions for a particular set of circumstances; selecting a compressor and a motor to optimize their operation at the part load value; and verifying that the selected compressor and the selected motor can be overspeeded to safely operate at the full load conditions. The method can include the further step of repeating the selecting and verifying steps until assured that the overspeeded compressor and motor are always within a predetermined range.

DESCRIPTION OF THE PREFERRED EMBODIMENT

Figure 1:
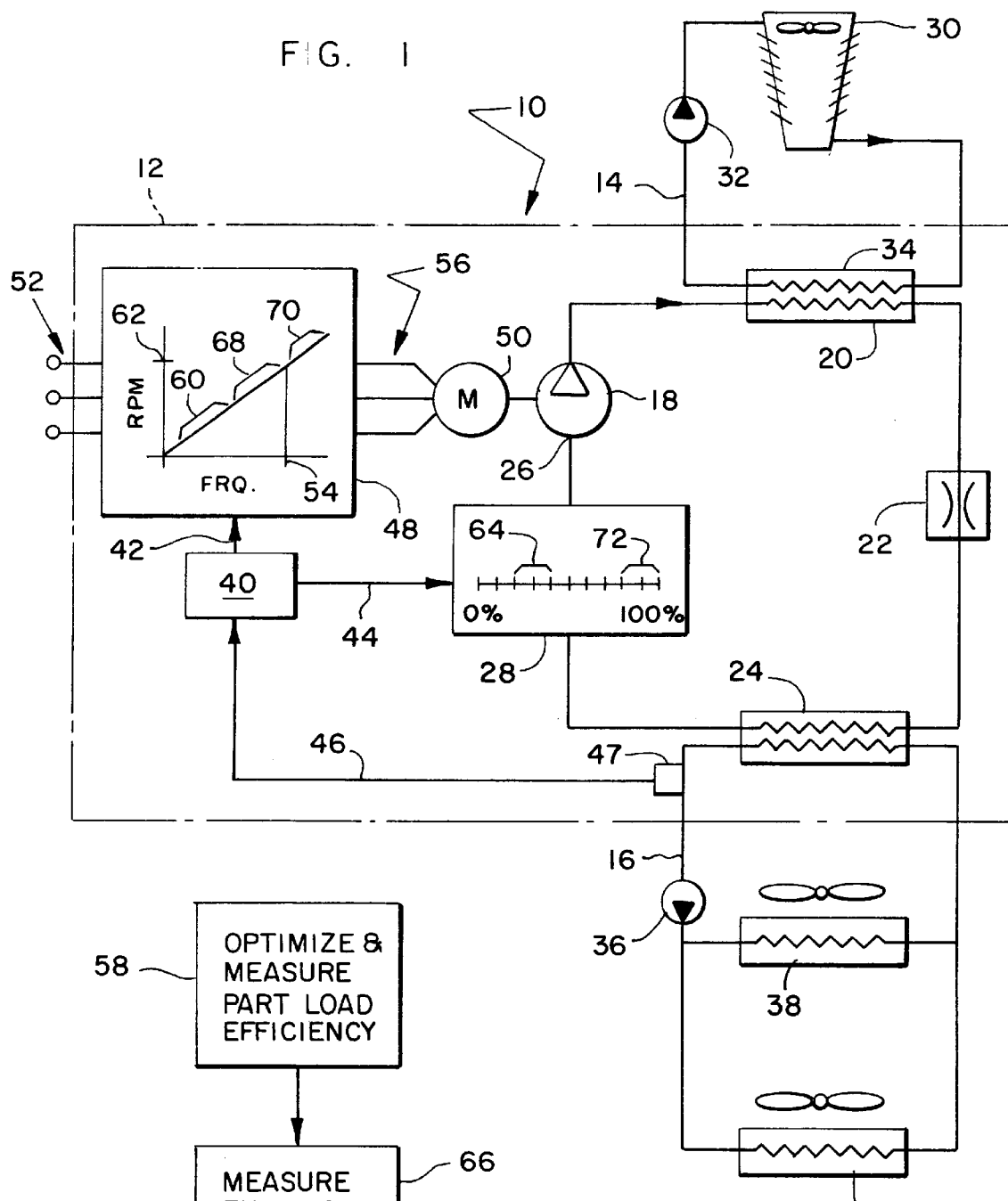
FIG. 1 is a schematic diagram of a chiller system that includes a variable speed chiller with inlet guide vanes, wherein the chiller is operated and rated according to the subject invention.

A chiller system 10 of FIG. 1 includes a chiller 12, a condenser circuit 14, and an evaporator circuit 16. Chiller 12 includes a compressor 18 that is schematically illustrated to encompass various types of compressors including, but not limited to, centrifugal, screw, and scroll compressors. Exemplary compressors are sold by The Trane Company, a Division of American Standard Inc., under the trademarks CenTraVac, Series R and 3-D respectively.

In operation, compressor 18 discharges refrigerant in series through a condenser 20, a flow restriction 22, and an evaporator 24. From evaporator 14, the refrigerant returns to a suction inlet 26 of compressor 18 to provide a closed loop refrigerant circuit. In some cases, a set of inlet guide vanes 28 throttles the refrigerant flowing from evaporator 24 to suction inlet 26.

While passing through condenser 24, compressed refrigerant is cooled by a heat absorbing fluid, such as water or ambient air. In FIG. 1, for example, the refrigerant in condenser 20 is cooled by water coming from a cooling tower 30. Cooling tower 30 exposes the water to ambient air, which cools the water by direct contact and/or by evaporative cooling. A pump 32 circulates the water between cooling tower 30 and a waterside portion 34 of condenser 20.

After the water cools the refrigerant in condenser 20, the refrigerant passes through flow restriction 22, which lowers the refrigerant's pressure and temperature. Flow restriction 22 is schematically illustrated to encompass any flow-restricting device. Some examples of restriction 22 include, but are not limited to, an orifice, capillary tube, expansion valve, etc.

Downstream of flow restriction 22, relatively cold refrigerant enters evaporator 24 to cool water or some other heat emitting fluid. If water is used as the heat emitting fluid, the water is often referred to as chilled water, which a pump 36 pumps to several heat exchangers 38 for cooling various areas of a building.

Since the cooling demand of the building may vary, a control 40 adjusts the output or cooling effect of chiller 12 to meet the demand. Control 40 is schematically illustrated to encompass a wide variety of controls familiar to those skilled in the art. Examples of control 40 include, but are not limited to, computers, microcomputers, microprocessors, dedicated electrical circuits having discrete analog and/or integrated digital components, programmable logic controllers, and various combinations thereof. Exemplary controls are shown in U.S. Pat. No. 5,553,997 to Goshaw et al. and U.S. Pat. No. 6,085,532 to Sibik, both of which are commonly assigned and are incorporated by reference herein. Where appropriate, control 40 may be programmed using any one of a wide variety of conventional control schemes that are well known to those skilled in the art.

Control 40 adjusts the cooling effect of chiller 12 by outputting a speed control signal 42 and a guide vane opening signal 44 in response to one or more input signals, such as input signal 46 from a sensor 47, which indicates the temperature of the chilled water leaving evaporator 24

(known as Leaving Water Temperature or LWT). However, input signals representing other conditions of system 10 can be used instead of or in addition to signal 46.

Speed control signal 42, which is conveyed to a conventional inverter 48 (also known as a variable frequency drive), determines the rotational speed of an induction motor 50 that drives compressor 18. In response to signal 42, inverter 48 converts an electrical power input 52 at a nominal frequency 54 (e.g., a line frequency substantially equal to 50 or 60 Hertz) to an electrical power output 56 whose frequency determines the rotational speed of motor 50, and thus determines the speed of compressor 18. The frequency of output 56 may vary significantly above and below nominal frequency 54.

Guide vane signal 44 adjusts the extent to which guide vanes 28 open. Guide vanes 28 are schematically illustrated to represent any device that can adjustably throttle the flow of refrigerant leading to or passing through compressor 18. One example of guide vanes 28 is a set of variable pitch triangular blades circumferentially disposed around a throat or passageway leading to suction inlet 26 of compressor 18. The pitch angle of each of the blades determines the extent to which the passageway is blocked.

Figure 2:
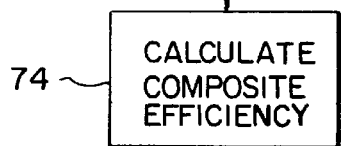
FIG. 2 is a flow diagram illustrating a process of producing the chiller of FIG. 1, wherein the chiller is optimized for operating at part load and rated based on its performance at both part load and full load conditions.

To optimize the performance of chiller 12 at a part load condition, and rate its overall efficiency for other operating conditions ranging from full load to part load, the process outlined in FIG. 2 is suggested. Referring to step 58 of FIG. 2, chiller 12 is designed (e.g., by way of a selection code or chiller component selection process) to run particularly well when operating under a part load, while placing less emphasis on the chiller's performance at a full load condition. To do this, the variable frequency of electrical output 56 may be set at a reduced frequency 60 that is less than nominal frequency 54 of electrical input 52, and/or the size of certain chiller components may be selected to favor operation at the part load condition. For example, the compressor's impeller diameter may be smaller than if it were sized to meet a full load condition at a nominal full speed 62 (i.e., compressor speed when driven by electrical input 52 at its nominal line frequency 54). When operating at part load, at times the compressor speed may need to increase to avoid a surge condition (i.e., partial reverse flow through compressor 50). Upon increasing the speed, signal 44 may need to partially close inlet guide vanes 28 to a less-open position 64, thereby maintaining operation at part load. To complete step 58, the chiller's part load efficiency (e.g., kw/ton) is measured and assigned a part load value or rating that reflects the chiller's performance at the part load condition.

Such "single point" efficiency or performance ratings (e.g., part load value or full load value) can be expressed in various forms, such as COP, EER, and kW/ton. COP, or Coefficient Of Performance, is a ratio of the chiller's cooling effect to the chiller's power consumption; with both terms of the ratio being expressed in common units, such as kilowatts. EER, or Energy Efficiency Ratio, is a ratio similar to the COP but with both terms of the ratio being expressed in different units. When using EER, the chiller's cooling effect is expressed in Btu/hr and the power consumption is in watts. A chiller's efficiency expressed in kW/ton is a ratio of a chiller's power consumption in kilowatts to its cooling effect in terms of tons of refrigeration. Thus, chillers that have a better efficiency have a higher COP and EER, and a lower kW/ton rating.

Next, in step 66, the chiller optimized for a part load condition in step 58 is tested (e.g., computer simulation and/or an actual laboratory test) at a full load condition. Full load conditions typically occur when the building being served by chiller 12 places a high cooling demand on heat exchangers 38. Thus, chiller 12 must work harder to keep the Leaving Water Temperature, as measured by sensor 47, at its target temperature. To do this, the speed of compressor 18 may need to increase, perhaps even beyond its nominal full speed 62. In some cases, the frequency of output 56 may need to be in the range identified by numeral 68 of FIG. 1, and in other cases, inverter 48 may need to provide output 56 at a frequency higher than the nominal line frequency of input 52, as indicated by numeral 70. Also, inlet guide vanes 28 may need to open fully or at least move from its less-open position 64 to a more-open position 72 to increase the refrigerant's flow rate. To complete step 66, the efficiency (e.g., kw/ton) of chiller 12 operating at full load is measured and assigned a full load value or rating that reflects the chiller's performance at the full load condition.

In some cases, a chiller optimized in step 58 may be unable to operate at a desired full load condition, due to limitations such as the critical speed of compressor 18 or some other physical limitation of chiller 12. To overcome this problem, compressor 18 may need an impeller of a larger diameter, evaporator 4 may need more heat exchanger tubes, or the chiller may need to be modified in some other manner. Once a preliminary configuration of chiller 4 is determined, steps 58 and 66 can be repeated. If necessary, steps 58 and 66 can be repeated several times in an iterative manner until desired chiller performance levels are achieved at both part load and full load conditions. The selection process used in determining the various features and components of chiller 4 is known as a selection code. It should be appreciated by those skilled in the art that such an iterative selection process can be carried out without actually building and testing various chillers. The performance of a proposed chiller can be predicted based on empirical data and known scientific principles.

When chiller 12 can perform successfully at part load and full load conditions, chiller 12 can be assigned a composite rating that indicates the chiller's overall performance. In step 74, the composite rating can be calculated in any one of a variety of ways based on the chiller's rated full load value and one or more part load values. The composite rating is preferably biased to favor a part load value, particularly when chiller 12 is expected to run more often under part load.

In a preferred embodiment of the invention, the composite rating is based on a full load value and three part load values. The part load values represent the performance of chiller 4 at 75%, 50% and 25% of full load. The full load value and each of the part load values are preferably weighted differently, with the full load value, 75% load value, 50% load value and 25% load value each contributing 1%, 42%, 45% and 12%, respectively, to the chiller's composite rating. For example, if the full load value is 0.63 kw/ton, the 75% value is 0.49 kw/ton, the 50% value is 0.39 kw/ton and the 25% value is 0.50 kw/ton, then the composite rating equals 0.44 kw/ton (1/(0.01/0.63+0.42/0.49+0.45/0.39+0.12/0.5)).

If desired, a further step well within the scope of the invention would be publishing the calculated composite rating. This could be done in a variety of ways including, but not limited to, printing, stamping, etching, or otherwise marking the composite rating on a conventional nameplate attached to chiller 12.

Although the invention is described with reference to a preferred embodiment, it should be appreciated by those skilled in the art that other variations are well within the scope of the invention. Therefore, the scope of the invention is to be determined by reference to the claims, which follow.

We claim:

1. A method of rating a chiller's performance, wherein the chiller's performance is of a chiller that includes a compressor driven by a motor, which in turn is driven by an inverter that creates an electrical output having a variable frequency from an electrical input of a nominal frequency, comprising:

determining a part load value that reflects the chiller's performance at a part load condition, wherein the variable frequency of the electrical output at the part load condition is at a reduced frequency that is less than the nominal frequency of the electrical input;

determining a full load value that reflects the chiller's performance at a full load condition, wherein the variable frequency of the electrical output at the full load condition deviates from the nominal frequency of the electrical input and is greater than the reduced frequency; and providing a composite rating based on the part load value and the full load value, whereby the composite rating indicates the chiller's performance overall.

2. The method of claim 1, wherein the variable frequency of the electrical output at the full load is greater than the nominal frequency of the electrical input.

3. The method of claim 1, wherein the variable frequency of the electrical output at the full load is less than the nominal frequency of the electrical input.

4. The method of claim 1, wherein the compressor is a centrifugal compressor.

5. The method of claim 1, wherein the compressor is a screw compressor.

6. The method of claim 1, wherein the compressor is adapted to compress a refrigerant whose flow is throttled by an inlet guide vane that can move between a more-open position at the full load condition and a less-open position at the part load condition.

7. The method of claim 1, wherein the inverter conveys electrical power to the motor, and the chiller's performance at the full load condition and the part load condition varies with the amount of electrical power conveyed to the motor.

8. A method of rating a chiller's performance, wherein the chiller's performance is of a chiller that includes a compressor adapted to compress a refrigerant whose flow is throttled by an inlet guide vane that can move between a more-open position and a less-open position, wherein the compressor is driven by a motor, which in turn is driven at various speeds by an inverter that creates an electrical output from an electrical input, wherein the electrical output has a variable frequency and the electrical input is at a substantially constant nominal frequency, comprising:

determining a part load value that reflects the chiller's performance at a part load condition, wherein the variable frequency of the electrical output is at a reduced frequency that is less than the substantially constant nominal frequency of the electrical input and the inlet guide vane is at its less-open position;

determining a full load value that reflects the chiller's performance at a full load condition, wherein the variable frequency of the electrical output is greater than the reduced frequency and the inlet guide vane is at its more-open position; and providing a composite rating based on the part load value and the full load value, whereby the composite rating indicates the chiller's performance overall.

9. The method of claim 8, wherein the compressor is a centrifugal compressor.

10. The method of claim 8, wherein the compressor is a screw compressor.

11. The method of claim 8, wherein the inverter conveys electrical power to the motor, and the chiller's performance at the full load condition and the part load condition varies with the amount of electrical power conveyed to the motor.

12. A method of rating a chiller's performance, wherein the chiller's performance is of a chiller that includes a compressor adapted to compress a refrigerant whose flow between an evaporator and a condenser is throttled by an inlet guide vane that can move between a more-open position and a less-open position, wherein the compressor is driven by a motor, which in turn is driven at various speeds by an inverter that creates an electrical output from an electrical input, and wherein the electrical output has a variable frequency and the electrical input is at a substantially constant nominal frequency, comprising:

at a full load condition, conveying into the condenser a heat absorbing fluid at a full load condenser temperature, wherein the heat absorbing fluid once inside the condenser absorbs heat from the refrigerant;

at the full load condition, conveying into the evaporator a heat emitting fluid at a full load evaporator temperature, wherein the heat emitting fluid once inside the evaporator rejects heat to the refrigerant;

at a reduced load condition, conveying into the condenser the heat absorbing fluid at a reduced load condenser temperature that is lower than the full load condenser temperature;

at the reduced load condition, conveying into the evaporator the heat emitting fluid at a reduced load evaporator temperature that is lower than the full load evaporator temperature;

operating the chiller at the full load condition and at a full load efficiency, wherein the guide vane is at the more-open position, and the variable frequency is at least as great as the substantially constant nominal frequency;

operating the chiller at the reduced load condition and at a reduced load efficiency that is better than the full load efficiency, wherein the guide vane is at the less-open position, and the variable frequency is less than the substantially constant nominal frequency; and providing a composite rating based on the full load efficiency and the reduced load efficiency, whereby the composite rating provides an indication of the chiller's performance overall.

13. The method of claim 12, wherein the variable frequency of the electrical output at the full load is greater than the nominal frequency of the electrical input.

14. The method of claim 12, wherein the compressor is a centrifugal compressor.

15. The method of claim 12, wherein the compressor is a screw compressor.

16. The method of claim 12, wherein the inverter conveys electrical power to the motor, and the chiller's performance at the full load condition and the part load condition varies with the amount of electrical power conveyed to the motor.

* * * * *